United States Patent [19]

Sakaue

[11] 4,196,863
[45] Apr. 8, 1980

[54] TAPE WINDING APPARATUS

[75] Inventor: Yoshikazu Sakaue, Amagasaki, Japan

[73] Assignee: Mitsubishi Denki Kabushiki Kaisha, Tokyo, Japan

[21] Appl. No.: 913,346

[22] Filed: Jun. 7, 1978

[30] Foreign Application Priority Data

Jun. 9, 1977 [JP] Japan .................................. 52-68534

[51] Int. Cl.² ...................... H01F 41/12; B65H 81/08
[52] U.S. Cl. ...................................... 242/7.08; 57/10; 242/7.23
[58] Field of Search ........................... 57/10, 11, 13, 18; 242/7.23, 7.21, 7.08; 156/446, 425, 428

[56] References Cited

U.S. PATENT DOCUMENTS

| | | | |
|---|---|---|---|
| 2,279,114 | 4/1942 | Ewaldson et al. | 57/18 |
| 2,875,570 | 3/1959 | Sarracino | 57/13 |
| 3,221,401 | 12/1965 | Scott et al. | 242/7.23 |
| 3,380,675 | 4/1968 | Baxter, Jr. et al. | 242/7.21 |
| 3,997,122 | 12/1976 | Helfand et al. | 57/18 |

*Primary Examiner*—Billy S. Taylor
*Attorney, Agent, or Firm*—Oblon, Fisher, Spivak, McClelland & Maier

[57] ABSTRACT

A tape winding apparatus including a base member which revolves around a body around which a tape is wound such as a coil conductor used in a large-size rotary machine and advances or retreats in the axial direction of the revolution; first supporting means for a wound tape which is attached to the base member and can deliver the free end of the tape; a second support which is pivotally mounted about an axis to the base member by means of a pivot and is rotatable substantially normal to the rotational direction of the base member; a first roller projecting from the base member in the advancing or rewinding direction of the base member so that the peripheral surface of the first roller is close to or contacts the axial line of the axis thereof; and a second roller which is mounted to project from the second support and be separated from the first roller so that a given portion of the peripheral surface of the second roller is constantly positioned on or close to the axial line of the pivot, wherein the free end of the wound tape to be supported by the supporting means is wound around the body successively through the first and second rollers.

5 Claims, 11 Drawing Figures

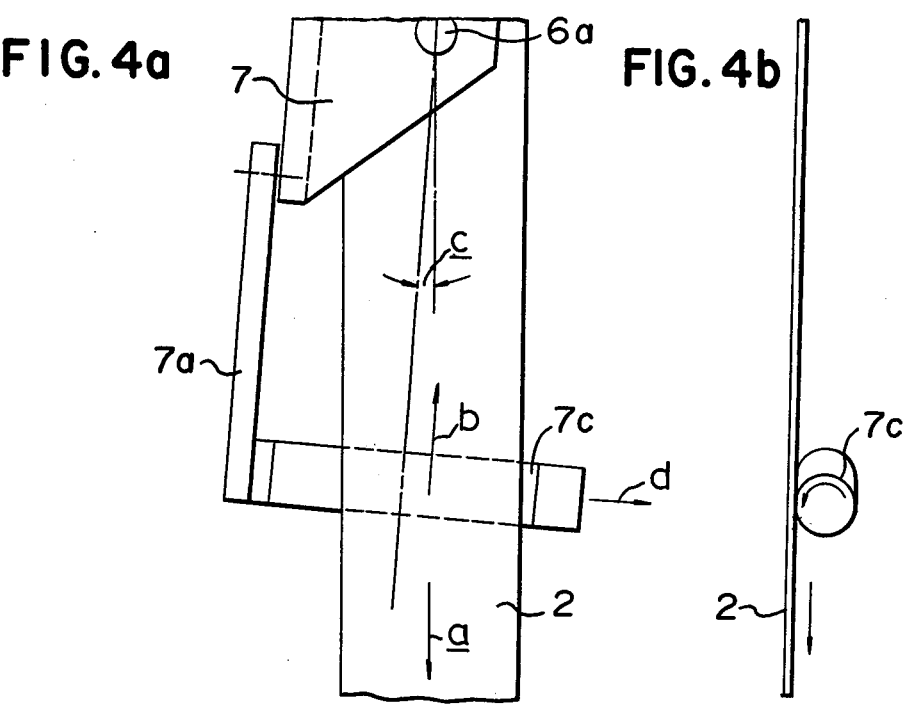
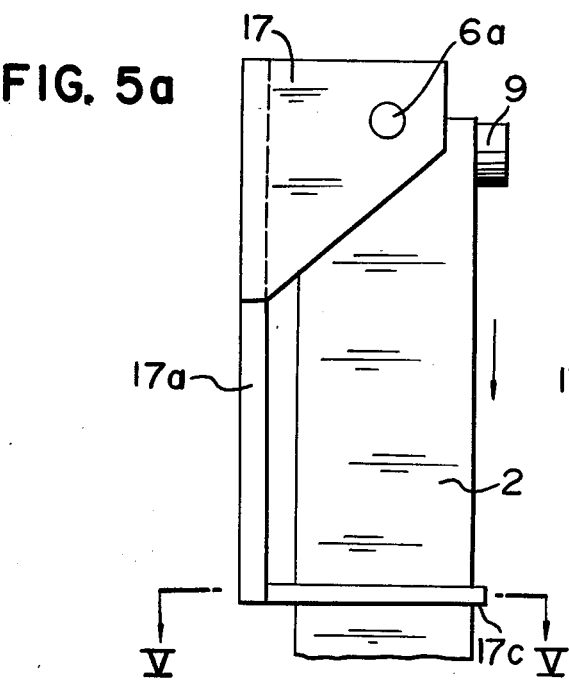
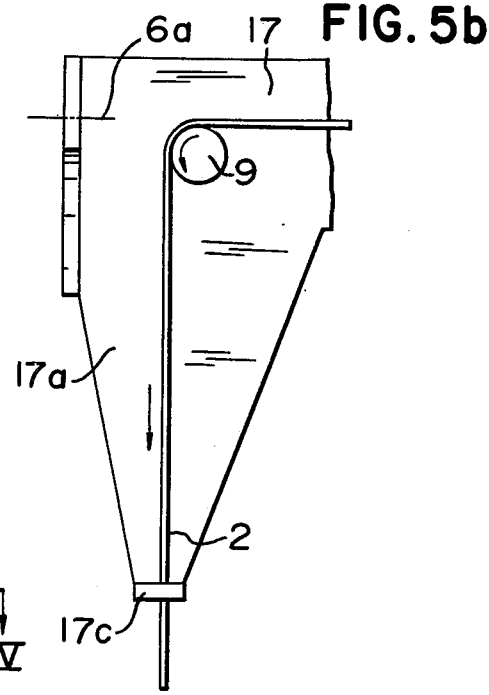
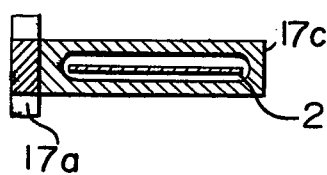

TAPE WINDING APPARATUS

BACKGROUND OF THE INVENTION

The present invention relates to a tape winding apparatus used mainly for winding an insulating tape around the coil conductor of a rotary machine and, more particularly, to the one with a mechanism for automatically providing an optimum winding angle as required.

It is common practice that the coil of the rotary machine is insulated by an insulating tape wound many times around the coil. In this case, the tape is wound while advancing its winding position by a given distance (called a pitch) each time the tape is wound one time. At this time, it is necessary to wind the tape with a given angle of inclination. The angle of inclination of the tape depends on the diameter of a body around which the tape is wound. Therefore, as the tape is wound so as to be multilayered, the angle of inclination gradually changes, even if the same body is used.

In FIG. 1a illustrating the case of a fine body (1), the angle of the tape-winding of the body (1) is designated by α, and in FIG. 1b illustrating the case of a thick body (1), the tape-winding angle is designated by β. As the tape is progressively wound and reaches the end of the body (1), the winding direction of the tape is reversed and its winding continues. In this case, the winding angle must be changed to be −β. In the figure, (P) designates the pitch.

In general, a tape winding apparatus winds the tape around a spool or the like and around the body, revolving it around the axis of the body while advancing its winding position along the axis at a given speed. At this time, the tape rotates around the body while at the same time turning (revolving) spirally. The distance that the winding tape advances along the axis for each revolution of the winding tape is coincident with the pitch. For this reason, the tape winding apparatus is generally provided with a mechanism for turning the winding tape and another mechanism for moving the former one along the axis of the body. In the tape winding apparatus with such a construction, if the tape winding is accomplished with insufficient pulling of the tape, the tape-wound body takes on a furrowed outer appearance. More adversely, when the tape is additionally wound on the upper layer of the furrowed tape-wound body, there occurs a slippage in the winding. Such facts are very disadvantageous. Therefore, the tape winding must be conducted with sufficient pulling of the tape. Various methods for stably giving a sufficient tension to the tape being wound, have been proposed. When the tape is wound with sufficient tension being applied thereto, if the angle of inclination of the delivering or feeding tape at the tape-feeding portion is not coincident with the tape-winding angle with respect to the body, the tension developed at the tape winding is disproportionately concentrated on only one side of the tape. Therefore, the tape is likely to be torn or broken off. It is for this reason that the tape winding apparatus is so designed that the tape is delivered with sufficient tension and the coincidence of the inclination angle of the tape being taken out with the tape winding angle.

In a conventional tape winding apparatus, the tape feeding portion is mounted with its entire of inclination, as shown in FIG. 2, for example. In the figure, (1) designates a body around which the tape is wound, (1a) designates a portion of the body where the tape has superposedly been wound from right to left, and (1b) designates another portion of the body where the tape is being wound on the portion (1a) from left to right. Reference numeral (2) designates a tape and numeral (2a) a winding tape. The winding tape (2a) is mounted through a winding-angle providing mechanism to a base member (3) revolving around the axis of the body (1) in order that it is rotatable by a supporting member (5). The winding-angle mechanism (4) is comprised of a mounting member (4b) pivotable with respect to the base member (3) by means of a hinge (4a), a bolt (4c), and a fixed nut (4d). The tape winding tension is produced by a reaction generated when the tape is fed from the wound tape (2a) due to friction between one edge surface of the wound tape (2a) and a pressure plate (5b) pressed by a spring (5a) and the supporting member (5) attached to the mounting member (4b).

In the conventional tape winding apparatus thus constructed, when the tape winding angle (α) coincides with the mounting angle (θ) of the wound tape, the same tension is produced at both edges of the tape in the tape length ranging from the wound tape (2a) to the tape winding point, thus minimizing the occurance of cutting the tape and providing a stable taping. The mounting angle (θ) of the wound-tape may smoothly be fine-adjusted with a construction that the entire mounting portion rotates around the hindge (4a) by adjusting the fixed nut (4d) of the winding angle providing mechanism (4). In this manner, the winding angle (α) is made to coincide with the wound-tape mounting angle (θ).

As previously stated, the tape-winding angle (α) changes depending on the diameter of the tape wound body (1). Accordingly, the angle changes when the direction of the winding direction changes or the superposing frindge of the tape changes. Therefore, the conventional tape winding apparatus must adjust the mounting angle (θ) by the fixed nut (4d) to coincide with the winding angle (α). The failure of the adjustment brings about cutting of the tape so that the adjustment work is complex.

SUMMARY OF THE INVENTION

Accordingly, an object of the invention is to provide a tape winding apparatus in which the adjustment of the mounting angle of the wound-tape is unnecessary, tape breakage is almost eliminated and the tape winding work is made simple.

One of the advantages of the invention is that the tape winding apparatus of the invention is favorable particularly for the multilayer winding because it permits reciprocate tape winding. When a conventional tape winding apparatus employs an ordinary numerical control system, the tape winding occurs in the forward operation but is idle in the backward operation. On the other hand, the tape winding apparatus of the invention can execute the tape winding operation also in the reverse operation at the same speed as in the forward operation. Additionally, no manual operation is necessary at the beginning and end of the tape winding. Therefore, the efficiency of the tape winding is improved two to three times compared to the conventional one.

According to the invention, there is provided a tape winding apparatus comprising: a base member which revolves around a body around which a tape is wound and advances or reverse in the axial direction of the revolution; first supporting means for a wound tape which is attached to the base member and can deliver the free end of the tape; a second support which is pivotally mounted to said base member by means of a pivot and rotatable substantially normal to the rotational direction of the base member; a first roller projecting from the base member in the advancing or reversing of the base member so that the peripheral surface of the first roller is close to or contacts the axial line of the axis there; and a second roller which is mounted to project from the second support and be separated from the first roller so that a given portion of the peripheral surface of the second roller is constantly positioned on or close to the axial line of the pivot, wherein the free end of the wound tape to be supported by the supporting means is wound around the body successively through the first and second rollers.

The tape winding apparatus with such a construction may be readily and effectively controlled when it is used in combination with an electronic computer.

BRIEF DESCRIPTION OF THE DRAWINGS

FIG. 3b is a cross sectional view taken on line III—III in FIG. 3a.

FIGS. 4a and 4b illustrates the portion including a pivot, a second support and a projection for illustrating the operation of the embodiment in FIG. 3a;

FIG. 5a illustrates the portion including a pivot, a second support and a projection of another embodiment of the invention;

FIG. 5b shows a front view of the portion shown in FIG. 5a.

FIG. 5c shows a cross sectional view of the portion taken along line V—V in FIG. 5a;

DESCRIPTION OF THE PREFERRED EMBODIMENTS

Figure 1:
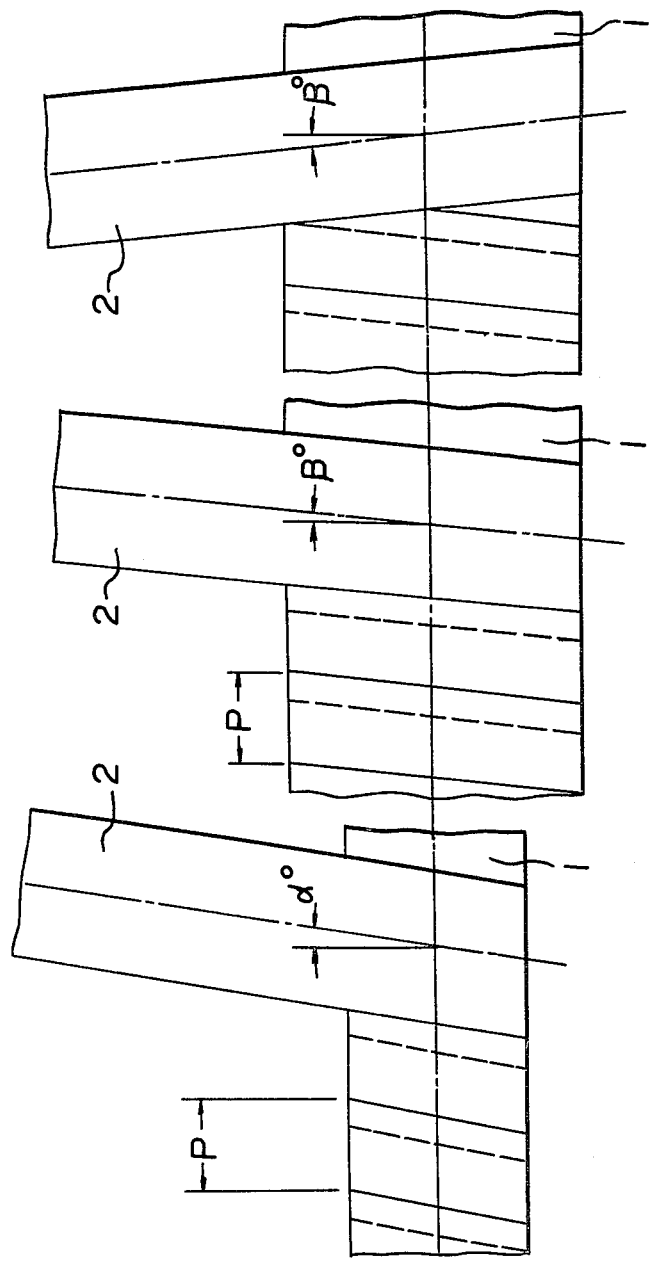
FIG. 1 illustrates a tape-winding angle with respect to a body around which a tape is wound.
Figure 2:
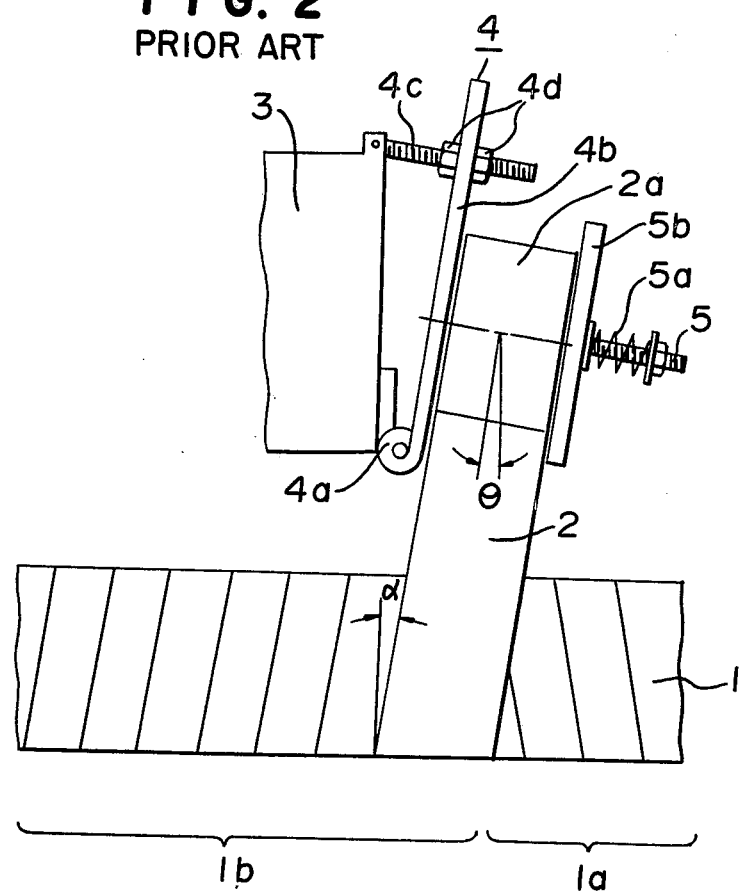
FIG. 2 shows a front view of a major part of a conventional tape winding apparatus.
Figure 3A:
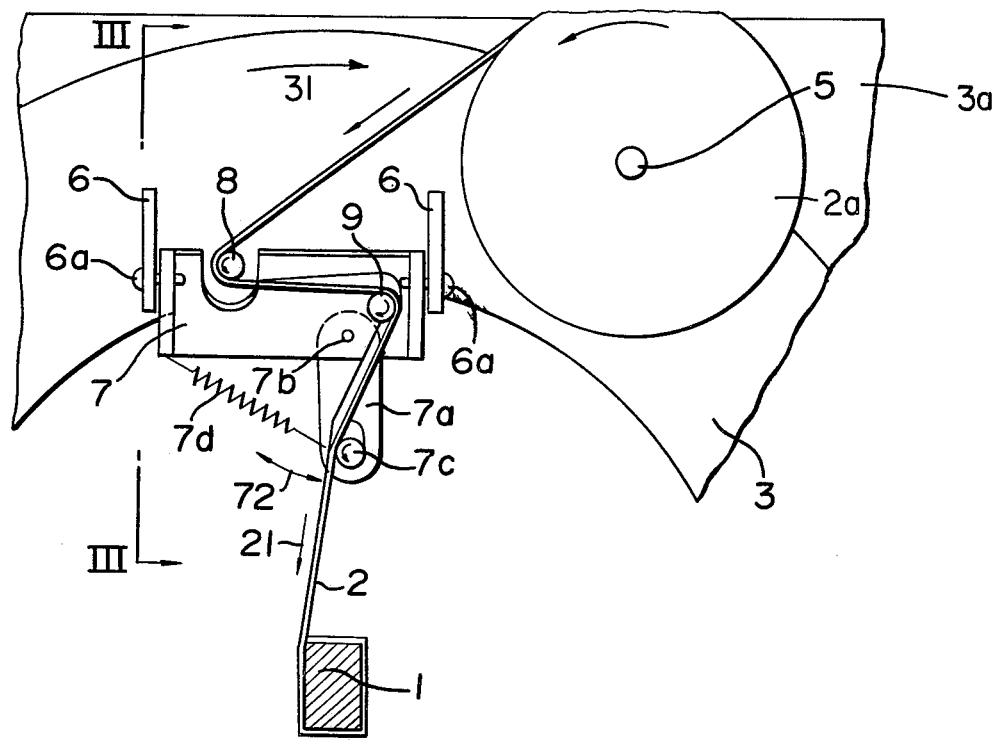
FIG. 3a is a front view of a major part of an embodiment of the invention.
Figure 3B:
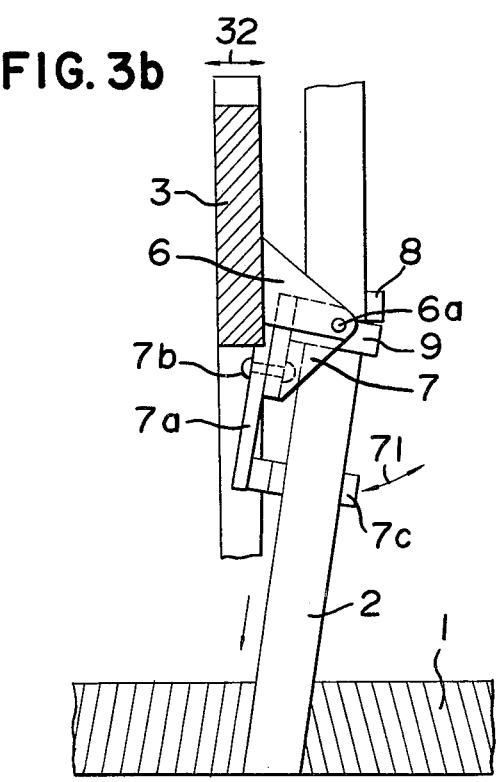

Reference is made to FIGS. 3a and 3b illustrating an embodiment of a tape winding apparatus according to the invention. In FIGS. 3a and 3b, reference numeral (6) designates mounting plates projecting from a base member (3) mounted on a frame (3a); numeral (6a) a pivot; numeral (7) a second support pivotally coupled with the base member (3) by means of a pivot (6a) and rotatable in the direction substantially normal to the rotating direction of the base member (3); numeral (7a) a projection rotatable around a pin (7b) implanted in the second support (7); (8) a first roller mounted on the base member (3) projecting therefrom with its peripheral close to or contacting with the axial line of the pivot (3); numeral (9) a second roller mounted on the second support (7) projecting therefrom and disposed apart from the first roller (8) so that the center of its peripheral surface is constantly positioned on or close to the axial line of the pivot (6a); numeral (7c) a third supporting member which is attached to the projection (7a), has a plane in parallel with the projection direction of the second roller (9), and revolves around the pivot together with the second support (7); (7d) a spring which biases the projection (7a) to the left as viewed in the drawing and absorbs variation of the tension produced in the tape (2). Arrows (31), (71) and (72) designate the rotating directions of the base member (3), the second support (7) and the projection (7a), respectively, arrow (21) indicates the moving direction of the tape (2) and arrow (32) designates an advance or retraction direction of the base member (3). In the figure, a mechanism for applying a tension to the tape (2) is illustrated. FIG. 3b illustrates a case where the base member (3) moves to the right as viewed in the figure and the supporting member (7c) uses a roller.

In the tape winding apparatus thus constructed, while the tape is taken out through the first roller (8), the second roller (9) and the supporting member (7c), the free end of the tape is swung in the direction of the tape width. In this case, since the tape (2) contacts with the supporting member (7c), the projection (7a) and the second support (7) rotates (i.e. inclines with respet to) around the axis (6a) as swinging member for the tape. FIG. 3b illustrates a case when the free end of the tape is swung to the left. In this case, the tape twists between the first roller (8) and the second roller (9). In this case, however, the center line in the width of the tape lies on line of extension of the axis (6a) so that, independently of the inclination of the second support (7), the plane involving the locus of a tangent line at the portion where the tape around the second roller (9) is always flush with a tangent line at the portion where the tape leaves the first roller (8). Therefore, both edges of the tape travelling between the rollers (8) and (9) each always have the same length even if the second support (7) inclines at any angle. This means that tension is equally exerted on both edges of the tape. Accordingly, the tape is placed in a state that it is much more resistive to being broken, compared to the case where the tension exerted on only the one side of the tape deviates from a given value.

The following is an explanation of tape movement when the direction of inclination of the second support (7) or the projection (7a) is not coincident with the direction of the tape tension and thus the tape (2) is disposed normal to the projecting direction of the support member (7c). In this case, the tape is automatically restored to its proper position.

FIG. 4a illustrates a state that the tape starts to run with an angle c of the support member (7c), the projection (7a) and the second support (7) against a running direction a of the tape. FIG. 4a is illustrated in a side view so as to well illustrate contact of the tape (2) with the support member (7c). When the tape travels in the direction of arrow a, the support member (7c) comprised of a roller rotating in contact with the tape rotates around its axis. Therefore, a force directed as shown by arrow b is exerted on the roller surface. As a result, the support member (7c) of a roller rotates around the axis (6a) in the direction of an arrow (d). In this manner, the angle between the second support (7) and the tape (2) gradually decreases so that the running direction of the tape completely coincides with the inclination of the second support (7).

The tape winding apparatus of this embodiment may use a fragile tape such as a paper tape without being broken. When a strong tape such as a polyamide tape is used, the apparatus used may be simple in construction. FIGS. 5a and 5b shows a portion of another tape winding apparatus including the stage, the projection and the support member, in which FIG. 5a is a side view of the apparatus portion, FIG. 5b is a front view thereof and FIG. 5c is a cross sectional view of the same taken along line V—V in FIG. 5a. In FIG. 5, the projection (17a) is constructed integral with the second support (17) and the support member (17c) has anelongated hole permitting the tape (2) to be wound to pass therethrough. As a matter of course, the projection rotatable as shown in FIG. 3a may be used in combination with the support member as shown in FIG. 5c.

In the embodiment shown in FIGS. 5a-5c, the winding operation starts and the tape is taken out from the wound tape while at the same time it is pulled in accordance with the tape-winding angle in a given direction (in the figure, the bottom end of the tape is pulled to the lower left or to the lower right). At this time, one side of the tape comes in contact with the tape guide so that the second support 17 rotates around the axis (6a) while at the same time the second roller (9) inclines. In the just-mentioned embodiment, the projection (17a) and the support member (17c) are used. However, it may be constructed such that the interval between the body (1) around which the tape is wound and the axis (6a) is shortened and, particularly in the case of a short-width tape, the projection and the support member for controlling the inclination of the second support (17) may be omitted.

With omission of members such as the support member to control the inclination of the second support (7), the taping may be smoothly conducted through the inclination of the second support (7) and the second roller (9) to such an extent that the distance between the body (1) and the axis (6a) is within three times the tape width.

The above-embodiment has been described with an assumption that the center in the width of tape running over the rollers (8) and (9) coincides with the axis line of the axis (6a). However, it is very difficult from the viewpoint of the mechanical construction. In practical use, it is acceptable that the direction of the axis (6a) is slightly off the tape travelling direction, as shown in FIG. 6. When slight separation takes place, there possibly occurs some trouble. However, the taping is possible without trouble so long as the deviation is up to the degree of ¼ the tape width.

Figure 6A:
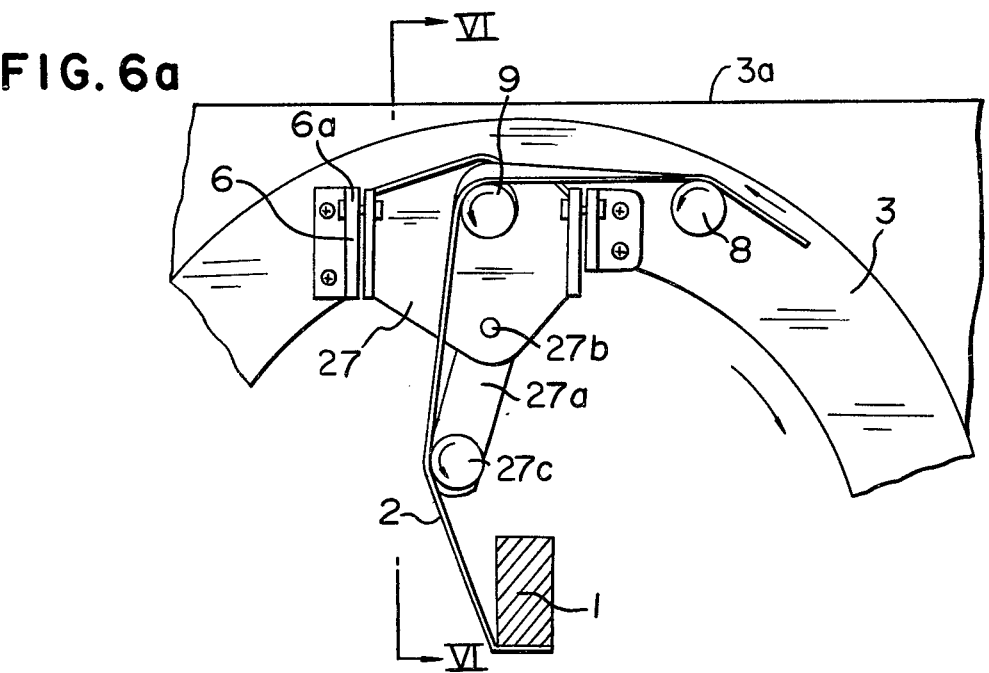
FIG. 6a shows a front view of a major part of still another embodiment of the invention.
Figure 6B:
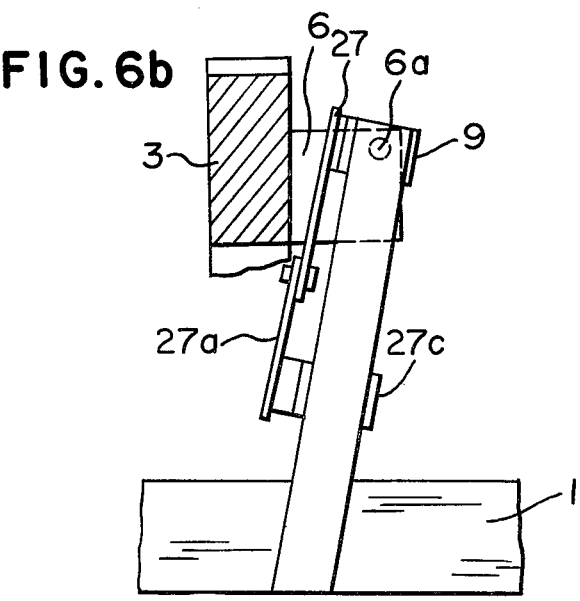
FIG. 6b shows a cross sectional view of the embodiment shown in FIG. 6a, taken along line VI—VI.

FIGS. 6a and 6b shows another embodiment of the tape winding apparatus according to the invention including second support (27), pin (27b) and support member (27c). FIG. 6a is a front view of the apparatus, and FIG. 6b is a side view taken along line II—II. The center in the width of the tape travelling between the first roller (8) and the second roller (9) is off the axial line of the axis (6a).

The above-embodiment is so designed that necessary tension is developed at the portion of a supporting means (5) of the wound tape (2a). In place of it, another known means may be used for the tension development. Furthermore, a plurality of the adjusting means for the tape-winding angle as shown in FIG. 3 may be installed on the same base member (3).

It will be understood that the tape winding apparatus according to the invention has other applications than the winding of the insulating tape.

As described above, the tape winding apparatus according to the invention has no need of setting the tape-winding angle, and provides a sufficient tension without being accompanied by generation of unevenly distributed tension possibly bringing about breaking of the tape or one-sided stretching of tape, even if the tape is pulled out at any angle. Therefore, the apparatus according to the invention can well provide tightly wound taping.

What is claimed is:

1. A tape winding apparatus including a frame member supporting a body about a longitudinal axis comprising:

a moveable base member mounted on said frame member which revolves around the body and around which a tape is wound, said base member being advanced and reversed along the longitudinal axis;

first supporting means having a first axis of rotation for a wound tape which is attached to said base member for delivering the tape;

a second support pivotally mounted, about a second axis of rotation normal to said first axis of rotation, to said base member by means of a pivot;

a first roller projecting from said base member so that the peripheral surface of said first roller is adjacent to or contacts the axial line of said second axis of rotation and a second roller which is mounted so as to project from said second support and be spaced from said first roller so that a given portion of the peripheral surface of said second roller is constantly positioned on or adjacent to the axial line of said pivot wherein the tape is wound around said body successively through said first and second rollers.

2. A tape winding apparatus including a frame member supporting a body about a longitudinal aixs comprising:

a moveable base member mounted on said frame member which revolves around the body and around which a tape is wound said base being advanced or reversed along the longitudinal axis;

first supporting means having an axis of rotation about a first plane for a wound rape which is attached to said base member for delivering the tape;

a second support including a projection which is pivotally mounted, about a second axis of rotation normal to said first axis of rotation, to said base member by means of a pivot;

a first roller projecting from said base member so that the peripheral surface of said first roller is adjacent to or contacts the axial line of said second axis of rotation;

a second roller which is mounted so as to project from said second support and be spaced from said first roller so that a given portion of the peripheral surface of said second roller is constantly positioned on or adjacent to the axial line of said pivot; and tape supporting means having a plane in parallel with the projecting direction of said second roller, said tape supporting means being mounted on said projection wherein the tape is wound around said body successively through said first and second rollers, and said projection.

3. A tape winding apparatus according to claim 2, wherein said projection is supported on said second support and is pivotally mounted thereto.

4. A tape winding apparatus according to claim 3, wherein said tape supporting means is a roller.

5. A tape winding apparatus according to claim 3, wherein said tape supporting means is a member having an elongated hole permitting the tape to pass therethrough.

* * * * *